United States Patent [19]

Chabre et al.

[11] 4,289,043
[45] Sep. 15, 1981

[54] PROTECTIVE DEVICE FOR AN INERTIA WHEEL ROTATING

[76] Inventors: André Chabre, 74 Rue Dombasle, 75075 Paris; Gérard de Saint-Ours, Côte de Chantepie, Chals Saint Mars 91780; Bernard Vrillon, 15 rue des Ecoles, 91320 Wissous, all of France

[21] Appl. No.: 6,122

[22] Filed: Jan. 24, 1979

[30] Foreign Application Priority Data

Jan. 30, 1978 [FR] France .................. 78 02497

[51] Int. Cl.³ ............................................ F16P 1/00
[52] U.S. Cl. .......................... 74/609; 248/544; 248/636; 415/121 G; 176/DIG. 2
[58] Field of Search ............ 74/608, 609; 415/121 G; 176/DIG. 2; 248/544, 548, 549, 611, 671, 680, 505, 506, 636

[56] References Cited

U.S. PATENT DOCUMENTS

| | | | |
|---|---|---|---|
| 1,383,386 | 7/1921 | Buchanan | 248/611 |
| 2,013,816 | 9/1935 | West | 415/121 G |
| 2,560,098 | 7/1951 | Fernstrum | 248/544 |
| 2,775,905 | 1/1957 | Jackson | 74/609 |
| 3,936,219 | 2/1976 | Holmes | 74/609 |

FOREIGN PATENT DOCUMENTS 95876 8/1922 France .................. 248/611

Primary Examiner—Kenneth Dorner

[57] ABSTRACT

A protective device for an inertia wheel rotating about an axis and mounted inside an enclosure comprising at least two anchoring frames, wherein the said device comprises a cowling of generally semicylindrical form whose axis is parallel to that of the said wheel and which surrounds the latter and a horizontal arm the first end of which is rigidly fixed near the top of the said cowling and at least three shock absorber sets, one of the said sets being fixed between the second end of the said arm and one of the said frames and operating in a horizontal direction, two other sets being fixed between the lower edges of the said cowling and another frame, while each shock absorber set may operate in both directions.

3 Claims, 7 Drawing Figures

PROTECTIVE DEVICE FOR AN INERTIA WHEEL ROTATING

BACKGROUND OF THE INVENTION

The present invention relates to a protective device against the breakage of an inertia wheel.

More precisely, this invention relates to a device which protects an installation from the damage which could be caused by any breakage of an inertia wheel mounted on a rotary machine. This rotary machine could be, for example, a primary pump for a nuclear reactor.

The device to which the invention relates is concerned more particularly with cases where the rotary machine has a horizontal axis and the wheel constitutes a relatively substantial mass. This device is particularly useful when the rotary machine, for example a motor-driven pump set, is placed inside an enclosure which is part of the safety arrangements for the installation as a whole, as is the case with nuclear plants for producing electrical energy.

Still more precisely, the device prevents fragments of the inertia wheel from flying off and thus becoming a projectile which could damage the confinement enclosure.

The hypotheses taken into consideration are as follows:

the speed of rotation of the wheel is equal to the nominal speed of rotation;

only cases where a quarter of the wheel flies off are taken into consideration; and the possibility of the kinetic energy of rotation being converted into kinetic energy of translation during accidental breakage of the wheel is taken into account.

BRIEF SUMMARY OF THE INVENTION

In conclusion, the device to which the invention relates provides a protection around the wheel so that, following the flying off of a quarter of the inertia wheel, no direct or secondary missiles are produced which could make impact with other installations.

The protective device for an inertia wheel rotating about an axis and mounted inside an enclosure comprising at least two anchoring frames is characterised in that it comprises a cowling of generally semicylindrical form the axis of which is parallel to that of the said wheel, the cowling surrounding the said wheel, and a horizontal arm the first end of which is rigidly fixed near the top of the said cowling and at least three shock absorption units, one of which is fixed between the second end of the said arm and one of the said frames and operates in a horizontal direction, whilst two other units are fixed between the lower edges of the said cowling and a second frame and operate in directions perpendicular to that of the said arm, each shock absorber unit being able to operate in both directions.

BRIEF DESCRIPTION OF THE DRAWINGS

In any case, the invention will be more readily understood from the following description of a number of embodiments of the invention which are given as non-restrictive examples. The description refers to the accompanying drawings, wherein.

DETAILED DESCRIPTION OF THE PREFERRED EMBODIMENTS

In the description which follows, cases where the axis of the rotary machine is horizontal are described. However, the invention is also applicable to cases where this axis is vertical, subject to adaptation of the fixing structures, which will be described hereinafter.

Figure 1:
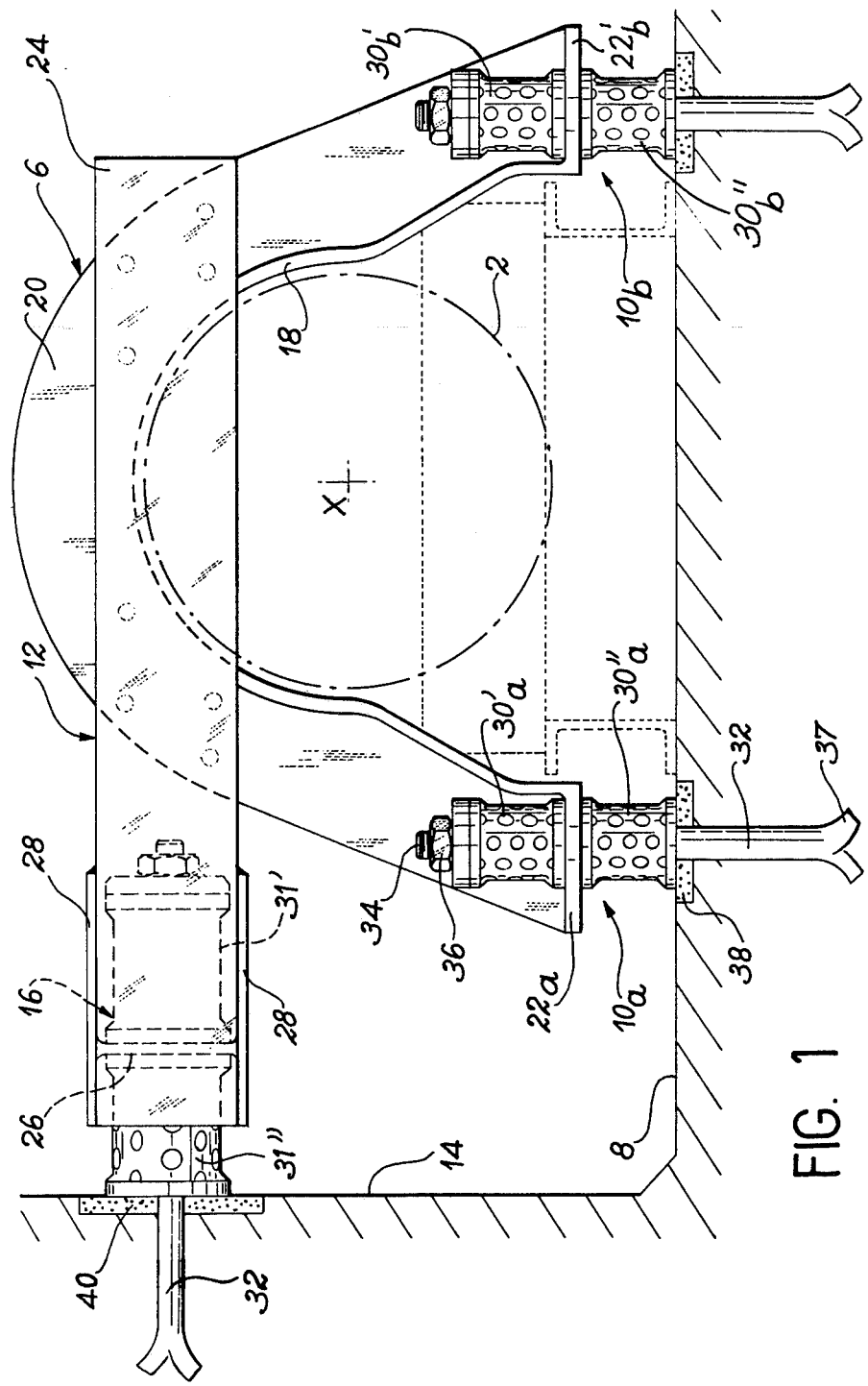
FIG. 1 shows an elevation of the protective device along a plane perpendicular to the axis of the rotary machine, which has a horizontal axis.

FIG. 1 shows the installation as a whole. It essentially comprises an inertia wheel 2 which is to be protected, mounted on a horizontal shaft. The latter is for example the shaft of a drive motor of a pump for a nuclear plant. It goes without saying that the device according to the invention could be used for purposes other than nuclear plants. However, it should be noted that, in this type of plant, particularly acute problems are faced with regard to the flawlessness of the enclosure in which the inertia wheel is located. Similarly, this safety device could be used to protect an enclosure from another rotary part having the same risks of breakage.

Figure 2:
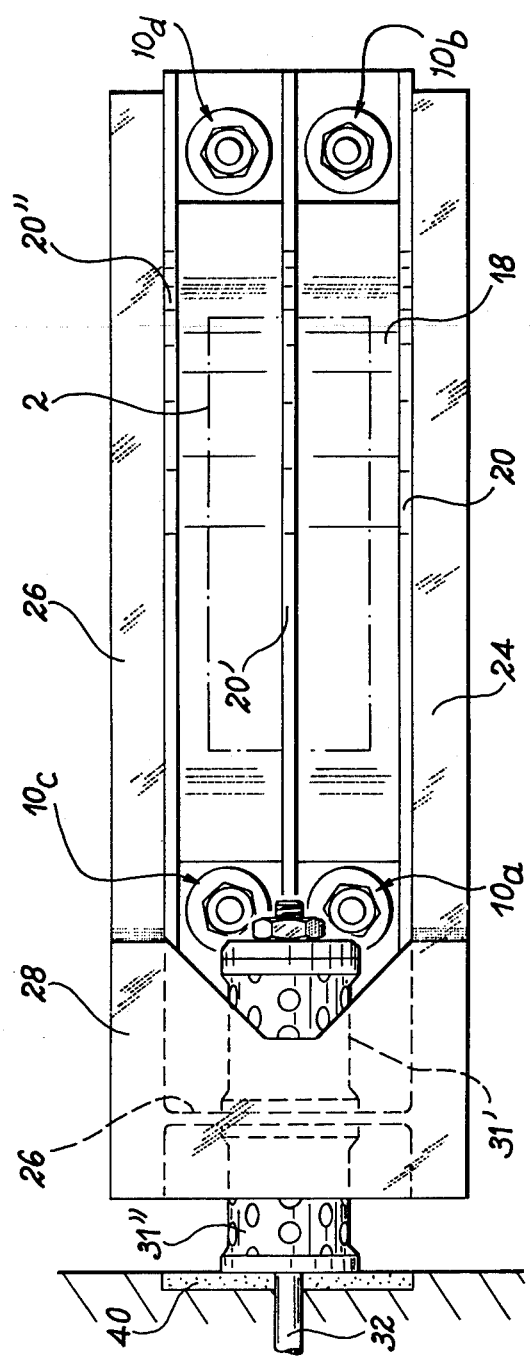
FIG. 2 shows a view of the device according to FIG. 1 from above.

In general terms, the device consists of a cowling 6 of semicylindrical form surrounding the inertia wheel 2 and part of the shaft and fixed in the ground 8 via four groups of shock absorbers, bearing the common reference numeral 10. In FIG. 1, only the shock absorber sets 10a and 10b are shown. FIG. 2 similarly shows the shock absorber sets which are symmetrical with the first two and are designated 10c and 10d respectively.

The installation also comprises a set of girders forming an arm 12 one end of which is fixed to the upper part of the cowling 6 and the other end of which is anchored in a vertical partition or wall 14 via another set of horizontal shock absorbers generally designated 16.

Before giving a more detailed description of a preferred embodiment of the invention, it is important to explain that, on the one hand, the part to be protected, i.e. the inertia wheel 2, is totally surrounded by the cowling 6 and floor 8. In other words, no projectiles consisting of broken-off parts of the wheel 2 can leave this enclosure. On the other hand it should be pointed out that the structure consisting of the cowling 6 and arm 12 is sufficiently rigid and has a mechanical strength such that virtually all the force from the impact of part of the inertia wheel against the cowling, in the case of breakage, is directly transmitted to the different sets of shock absorbers.

Naturally, the aim of these shock absorbers is to absorb almost all the energy resulting from the impact of a projectile against the cowling 6 in order to ensure that the walls of the enclosure in which the wheel 2 is housed are kept intact. In particular, the aim is to apply only very small mechanical stresses to the floor 8 and vertical wall 14. Moreover, another aim of the invention is to minimise the number of shock absorbers whilst ensuring effective protection regardless of the type of accident which occurs.

The cowling 6 consists essentially of a cylindrical sheet 18 made of steel, type E26, for example, about 20 mm thick. The mechanical strength and rigidity of this sheet 18 are improved by three longitudinal ribs 20, 20' and 20" which are most clearly visible in FIG. 2. The ribs are of course made from the same steel as the sheet 18 and are also preferably of the order of 20 mm thick. At its lower end, the cowling 6 comprises four attachment surfaces 22a, 22b, 22c and 22d, respectively, provided on the edges of the cowling to enable the shock absorber sets 10a, 10b, etc., to be attached thereto.

As has already been mentioned, the device is completed by a set forming a horizontal arm 12 fixed on the one hand to the cowling and on the other hand in the vertical wall 14 of the enclosure which is to be protected. The arm 12 consists essentially of two metal girders 24 and 24' which are preferably IPNs. At their free ends, these two girders 24 and 24' are connected by a transverse UPN 26 to which the shock absorber set 16 is effectively fixed. Preferably, the girder 26 is fixed to the girders 24 and 24' by upper and lower brackets having the common reference numeral 28. Preferably, the connection between the girders 24 and 24' and the cowling 6, on the one hand, and between these girders and the brackets 28 and girder 26 is effected by riveting. The riveting is, of course, designed so that all the forces applied to the cowling during accidental breakage of the inertia wheel are wholly transmitted to the dampeners of the set 16.

Each set of dampeners, whether of set 10 or set 16, is made up of at least two shock absorbers of generally cylindrical form, each designated 30, operating in opposite directions. These sets of two dampeners 30' and 30" are fixed on each side of the part which is to be locked. More precisely, in the case of sets 10, the dampeners 30' and 30" are placed on both sides of the plates 22. In the case of the dampener set 16, the dampeners 31' and 31" are fixed on both sides of the core of the girder 26. The dampeners are fixed in the walls by means of connecting rods such as 32 having a threaded end 34 co-operating with a nut 36 and at their other end they are anchored (end 37) in the floor in conventional manner. More precisely, the floor 8 or the vertical wall 14 may advantageously comprise a shoe 38 and a shoe 40 of a particular type for receiving the shock absorbers 30" and 31".

Figure 7:
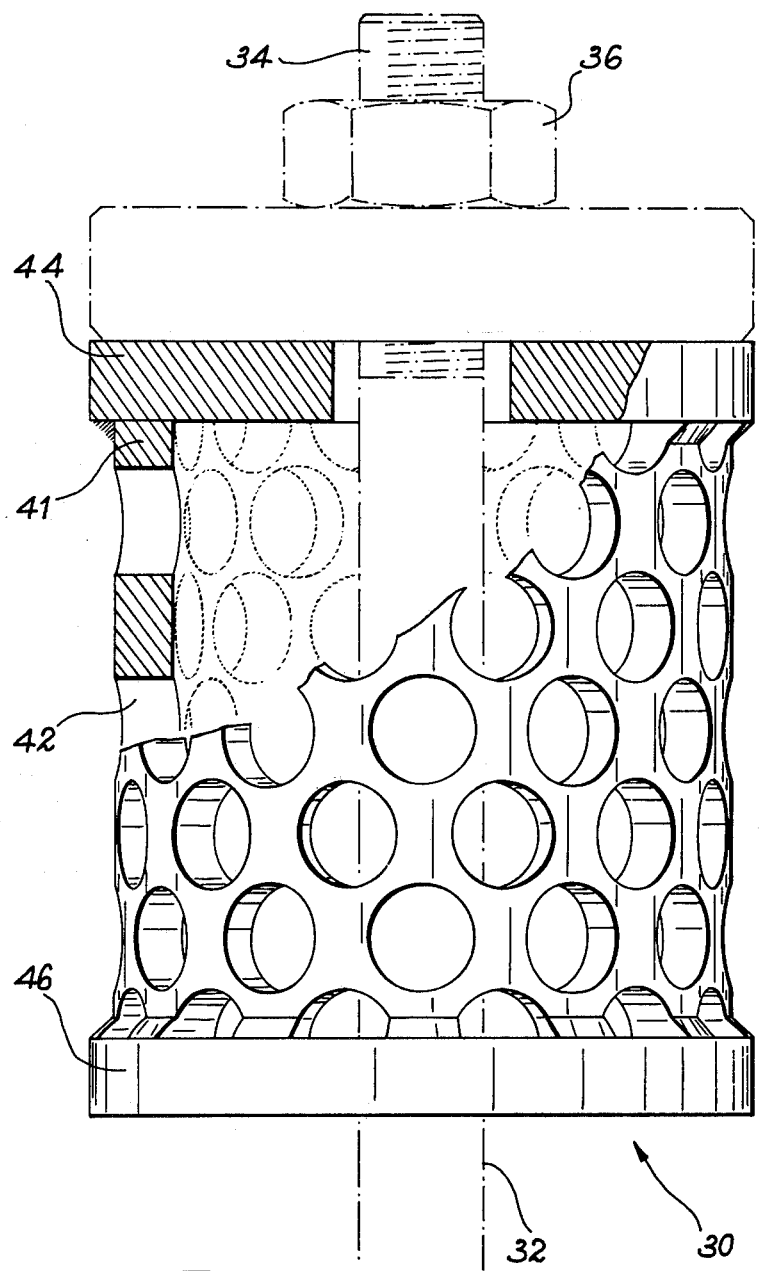
FIG. 7 shows an enlarged view of an embodiment of a shock absorber used in the construction of the device.

FIG. 7 shows a partial section and a partial perspective view and elevation of a shock absorber which is particularly suitable for use in the device according to the invention. This shock absorber consists of a cylindrical crown 41 drilled with circular holes such as 42 arranged in circles, so that, along the generating lines of the cylinder which constitutes these shock absorbers, there is substantially the same quantity of metal along all these generating lines. The shock absorber may comprise an upper shoe 44 and a lower shoe 46.

It goes without saying that the dimensions of the different parts or elements of the device should be chosen to suit the dimensions and speed of rotation of the inertia wheel, i.e. to suit the energy to be absorbed in the case of fracture of the moving part. However, it may be specified that, in any case, the cowling and arm should be sufficiently solid to transmit all the mechanical forces to the shock absorbers so that it is the latter which are deformed under the effect of the impact, and not the other mechanical members.

Figure 3:
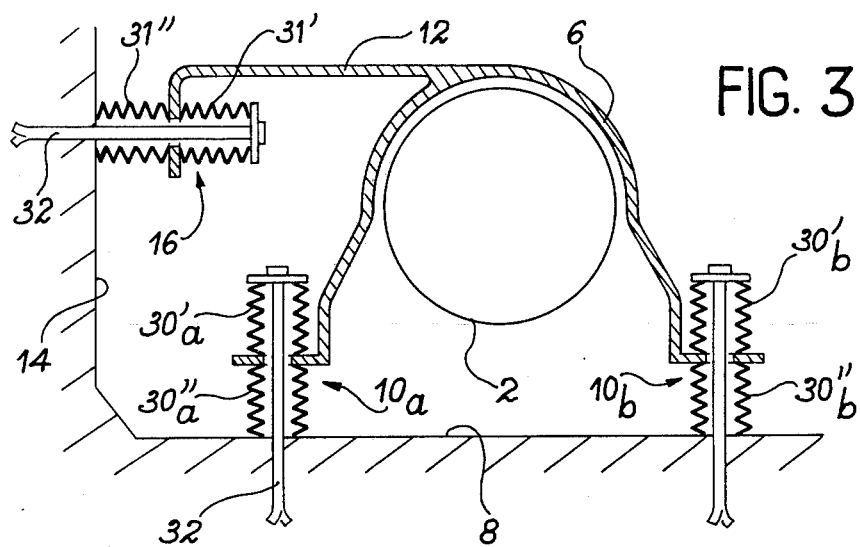
FIGS. 3 to 6 show diagrams illustrating the operation of the installation at rest and during the various types of accidents which may occur on operation of the rotary machine when it has a horizontal axis.
Figure 4:
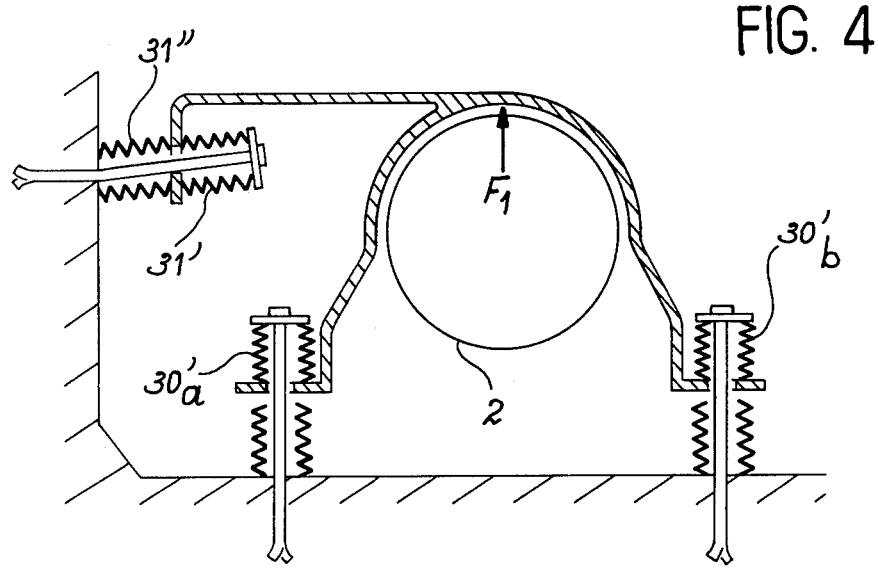
Figure 5:
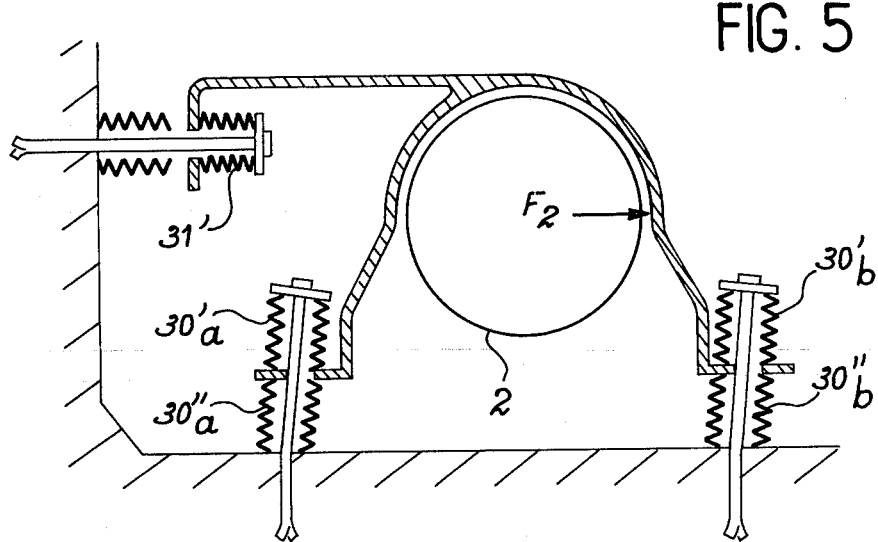
Figure 6:
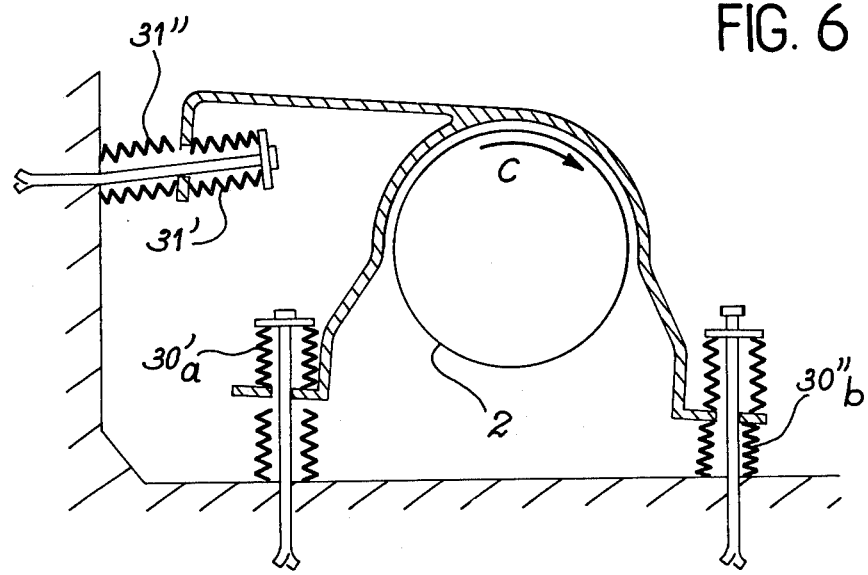

FIGS. 4 to 6 diagrammatically show the way in which the different sets of shock absorbers work depending on the types of accidents which may occur. FIG. 3 shows the whole assembly at rest.

FIG. 4 corresponds to the case where breakage of the wheel leads to the creation of projectiles which strike the cowling in a vertical direction. It will be seen that, in this case, the shock absorbers 10 operate, or to be more precise the upper absorbers of these groups, designated 30'.

FIG. 5 shows a case of transverse impact in the direction of the arrow $F_2$. In this case, the set of absorbers 16, or more precisely the absorber 31' of this set 16, operates as shown in the Figure.

Finally, FIG. 6 shows a case where the projectile causes a rotary movement of the cowling, indicated by the arrow C. In this case, as shown in the Figure, it is mainly the shock absorbers 30' of sets 10a and 10c which operate, whilst the shock absorbers 30" of sets 10b and 10d also operate.

It will be appreciated, from the foregoing description, that this solution means that all the projectiles which could be created by the breakage of an inertia wheel or, more generally, of a part rotating about a horizontal axis can be confined, without transmitting any appreciable energy to the walls of the enclosure in which the rotating part is placed. This result is obtained using means which are simple but highly effective and reliable. For example, taking a wheel 700 mm in diameter, 260 mm thick and having a speed of rotation of 1450 revolutions per minute, the kinetic energy of this wheel is 577.6 Kj. Taking this energy into account, this means that the cowling must be capable of absorbing, or more accurately the shock absorber sets must be capable of absorbing 144.4 Kj.

It should be added that, in a simplified embodiment, there may be only two shock absorber sets in all between the cowling and the floor 8, instead of the four shown in FIG. 1. In this case, of course, connecting rods 32 associated with these sets are arranged in the central vertical plane of the cowling perpendicular to the axis XX'.

As has already been mentioned, the device according to the invention may be used in cases where the shaft on which the inertia wheel is mounted is vertical. It will be appreciated that in this case the floor 8 must be replaced by a second vertical wall for anchoring the shock absorber sets 10a to 10d. If no such second wall is available, it is simple to provide a vertical structure which is strong enough to receive the anchorings of the shock absorber sets 10a to 10b. Another solution in these circumstances is to use the wall 14 for anchoring sets 10a and 10b and provide a structure for anchoring the single shock absorber element 16 fixed to the end of the arm 12. In this case, it is sufficient to provide, at each end of the hemispherical cowling 6, an end check strong enough to hold any fragments of the wheel after breakage which may have trajectories with a vertical component.

The functioning of this embodiment is identical to that described in connection with the embodiment shown in FIGS. 1 and 2. Modification of the trajectory of any fragments of wheel due to the effect of gravity in the vertical direction is taken into account by the end cheeks.

The invention is not limited to the embodiments described and represented hereinbefore and various modifications can be made thereto without passing beyond the scope of the invention.

What is claimed is:

1. A protective device for an inertia wheel rotatable about an axis and being mounted inside an enclosure comprising, at least two anchoring frames, wherein: said device is provided with a cowling of generally semi-cylindrical form having an axis parallel to said wheel and which surrounds the latter, said cowling being further defined respectively by first and second longitudinal edges and a top, said device also comprising a horizontal arm having first and second ends, said first end being rigidly fixed near the top of said cowling and at least three shock absorber assemblies, a first of the said assemblies being fixed between the second end of the said arm and one of said frames and operating in a horizontal direction, a second and third of said assemblies of said shock absorbers being fixed between said first and second edges of the said cowling and another of said frames and being operable in directions perpendicular to the said arm, and each of said respective shock absorber assemblies being operable in both directions.

2. A device according to claim 1, wherein: said second and third shock absorber assemblies are defined by at least two shock absorbers in the form of crowns having the same axis of rotation, the two shock absorbers constituting one assembly being arranged on one of the edges of the said cowling, said first shock absorber being fixed between said frames and one of the end of said arm.

3. A device according to claim 2, wherein; said shock absorbers are defined by a cylindrical crown drilled with circular holes distributed over said crown whereby the quantity of material along all the generating lines of the crown is substantially the same.

* * * * *